(12) United States Patent
Kuo

(10) Patent No.: US 6,808,272 B1
(45) Date of Patent: Oct. 26, 2004

(54) PROJECTOR AND METHOD FOR ASSEMBLY THEREOF

(75) Inventor: Chien-Fong Kuo, Tao-Yuan Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/604,457

(22) Filed: Jul. 22, 2003

(30) Foreign Application Priority Data

May 9, 2003 (TW) ........................................ 92112748 A

(51) Int. Cl.$^7$ ................ G03B 21/14; G03B 3/00; G02F 1/1333
(52) U.S. Cl. ........................ 353/119; 353/101; 349/58
(58) Field of Search ............................ 353/119, 31, 37, 353/98, 101, 102, 122; 349/60, 5, 58, 8, 9; 359/443, 237, 242; 348/744, 759, 766, 770–771

(56) References Cited

U.S. PATENT DOCUMENTS

| | | | | |
|---|---|---|---|---|
| 5,978,054 A | * | 11/1999 | Fujimori | 349/60 |
| 6,137,635 A | * | 10/2000 | Nakazawa | 359/621 |
| 6,675,470 B2 | * | 1/2004 | Muramatsu | 29/832 |
| 6,724,445 B2 | * | 4/2004 | Natsuyama | 349/58 |

* cited by examiner

*Primary Examiner*—Rodney Fuller
*Assistant Examiner*—Rochelle Blackman
(74) *Attorney, Agent, or Firm*—Winston Hsu

(57) ABSTRACT

The projector includes an image modulator, a lens, a supporting frame for supporting the image modulator and the lens, a circuit board, and a frame. The supporting frame includes a first fixed side, a second fixed side, and at least one elastic protrusion having one end connected to the first fixed side, and another end having a gap with the second fixed side. The method utilizes the elastic protrusion of the supporting frame to adjust relative positions of the image modulator and the lens to optimize the focus of the lens.

14 Claims, 7 Drawing Sheets

PROJECTOR AND METHOD FOR ASSEMBLY THEREOF

BACKGROUND OF INVENTION

1. Field of the Invention

The present invention relates to a projector, and more particularly, to a projector that can adjust relative positions of an image modulator and a lens.

2. Description of the Prior Art

Please refer to FIG. 1. FIG. 1 is a perspective view of a projector 10 according to the prior art. The projector 10 comprises a supporting frame 12, a lens 14, a digital micromirror device (DMD) 16, a frame 18, and a circuit board 20. The lens 14 and the DMD 16 are installed on two sides of the supporting frame 12 respectively. The supporting frame 12 fixes the relative position of the lens 14 and the DMD 16. The frame 18 fixes the DMD 16 to the supporting frame 12. The circuit board 20 electrically connects and transmits data to the DMD 16. Many problems may affect the imaging quality of the projector 10. For example, slight inaccuracies in component surfacing or placement may result in a blurred or distorted image. From optical principles, a fine focus requires relative positions of the DMD 16 and the lens to be parallel. With the positions of the DMD 16 and the lens 14 being determined, the supporting frame 12 for installing the DMD 16 and the lens 14 determines the resulting imaging quality. In other words, the two sides of the supporting frame 12 must be as parallel as possible. This is difficult to achieve in mass production. The error in placement can be limited to an acceptable range, however, this affects the imaging quality.

Please refer to FIG. 2. FIG. 2 is a schematic diagram of an imaging principle. In general, the imaging principle includes transmitting light of an object 22 through a lens 24, and focusing au image 26 on a screen. The light beam parallel to the line L of the lens 24 is refracted across the focal point F of the lens 24. The light passing through the center O of the lens 24 goes straight. An intersection point of the two light beams is the position of the image 26. A point A of the object 22 focuses on a point a of the screen. When the object 22 and the lens 24 are parallel, every point of the object 22 will focus on the screen to clearly form the image 26. When the object 22 and the lens 24 are not parallel, the light beam parallel to the line L of the lens 24 is refracted across the focus F of the lens 24, and light passing through the center 0 of the lens 24 travels straight, and a point B of the object 22 will focus on a point b off the screen.

From the above description, to achieve a clear image on the screen, the object 22 and the lens 24 must be parallel. For the projector 10 to have high imaging quality, the DMD 16 and the lens 14 have to be installed on two parallel surfaces respectively. The projector 10 according to the prior art uses the supporting frame 12 to fix the DMD 16 and the lens 14 and controls the out-of-parallel of the two sides of the supporting frame 12 in an acceptable range with mechanical design. The rigidity of the supporting frame 12 is also strengthened to prevent deformation caused by improper force during installation of the DMD 16 and the lens 14. However, the DMD 16 and the lens 14 have imprecise dimensions themselves, and with an error in placement through the supporting frame 12, the total error from parallel placement is often unacceptable. Therefore, the projector cannot project a clear image on the screen. Some projector manufacturers require lens manufacturers to provide lenses with less sensitivity to placement. Some projector manufacturers use spacers installed between the lens and the supporting frame. However, such spacers have fixed size so perfect focus is never achieved. In addition, other projector manufacturers match the lens with the supporting frame, matching defects in hope that they cancel out. Such matching is difficult and makes maintenance and part replacement inconvenient.

SUMMARY OF INVENTION

It is therefore a primary objective of the claimed invention to provide a projector and a method of adjusting the relative positions of the image modulator and the lens to solve the above-mentioned problem.

According to the claimed invention, a projector and a method for assembling a projector are provided. The projector comprises a lens; a supporting frame including a first fixed side, a second fixed side, and a elastic protrusion, the first fixed side having a first screw hole, the second fixed side having a second screw hole; a fixing device having a first through hole and a second through hole respectively located corresponding to the first screw hole and the second screw hole; and an image modulator installed between the supporting frame and the fixing device, the image modulator having a first modulator side corresponding to the first fixed side of the supporting frame, and a second modulator side corresponding to the elastic protrusion.

The claimed method comprises (a) tightly screwing the first screw into the first screw hole through the first through hole to combine the fixing device and the supporting frame, the first modulator side of the image modulator fixed on the first fixed side of the supporting frame; (b) loosely screwing the second screw into the second screw hole through the second through hole making the second modulator side of the image modulator contact the elastic protrusion; (c) projecting an image to a screen, adjusting the lens to focus the image from the first modulator side of the image modulator on the screen; and (d) adjusting the second screw in the second screw hole making the image modulator press the elastic protrusion to move until the image from the second modulator side of the image modulator is in focus on the screen.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
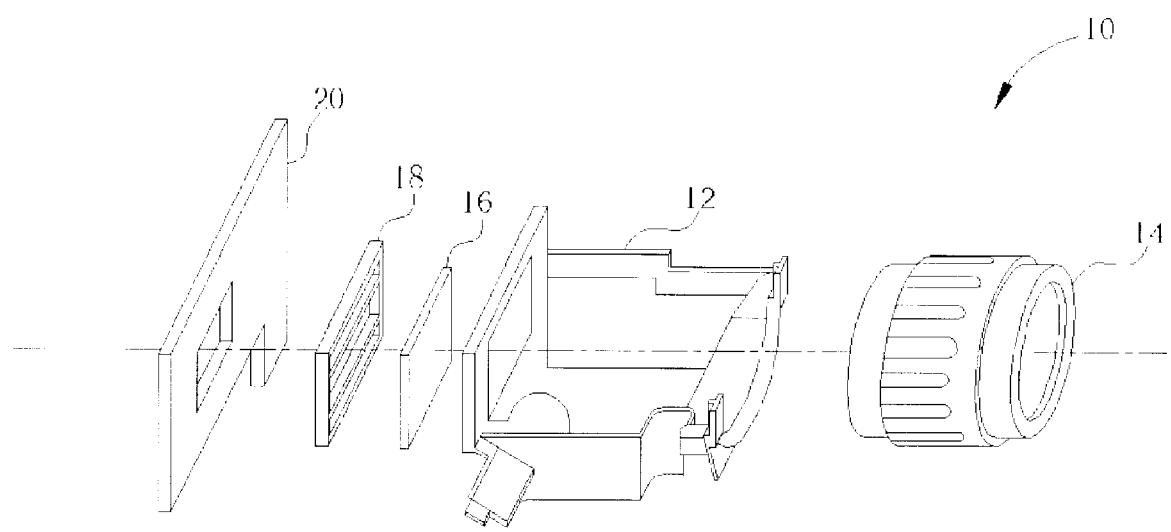
FIG. 1 is a perspective view of a projector according to the prior art.
Figure 2:
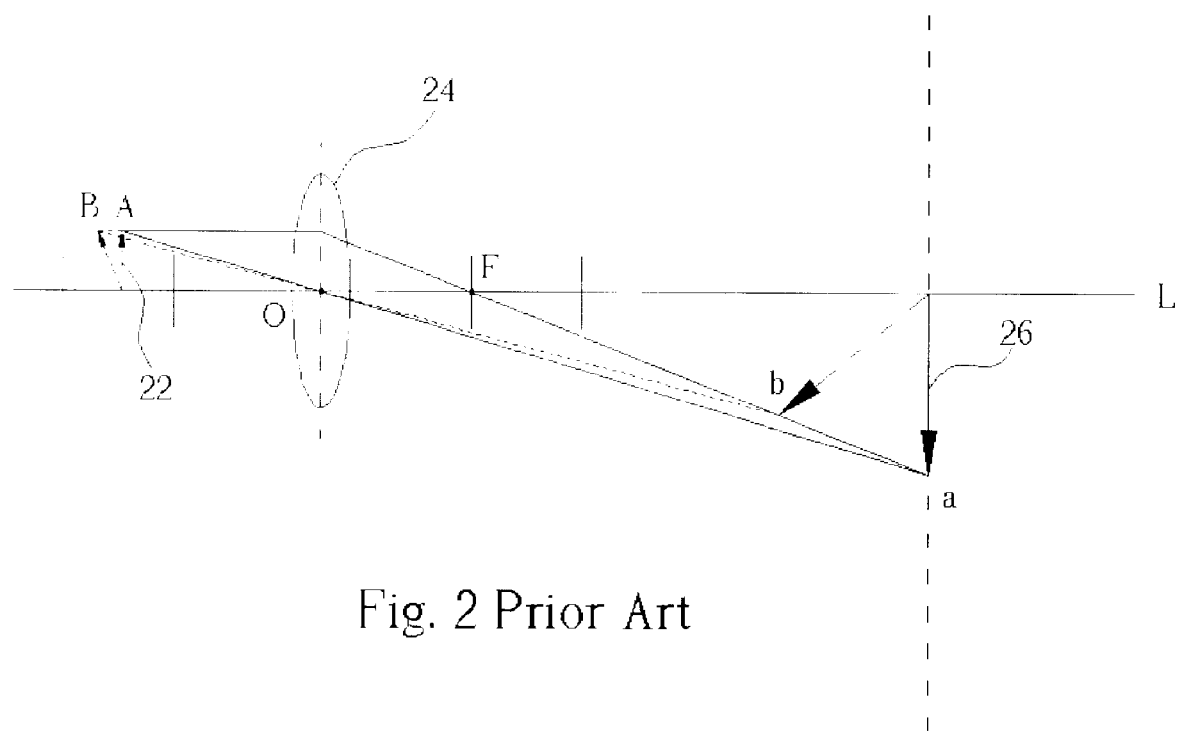
FIG. 2 is a schematic diagram of an imaging principle.
Figure 3:
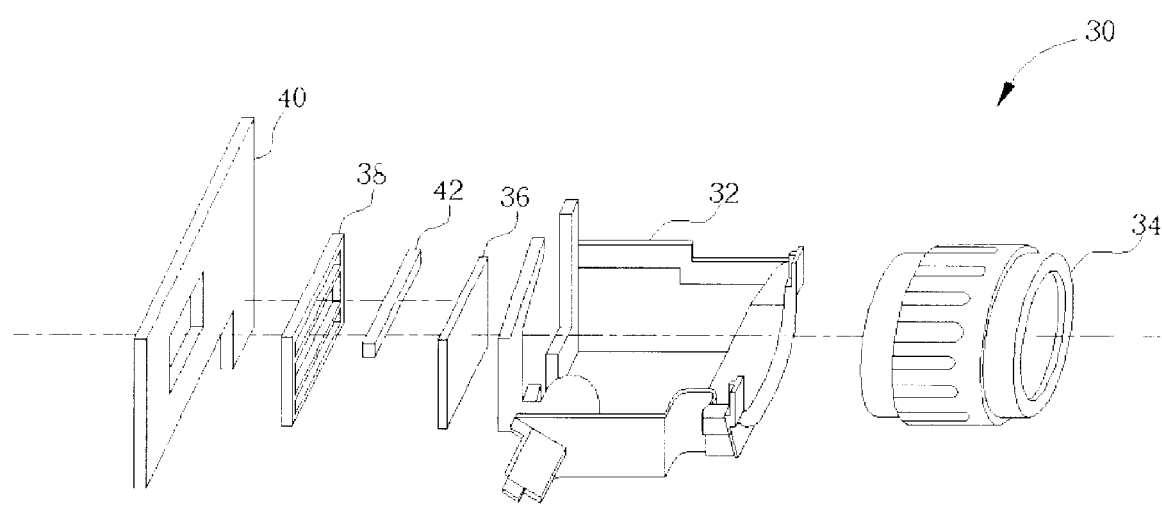
FIG. 3 is a perspective view of a projector according to the present invention.
Figure 4:
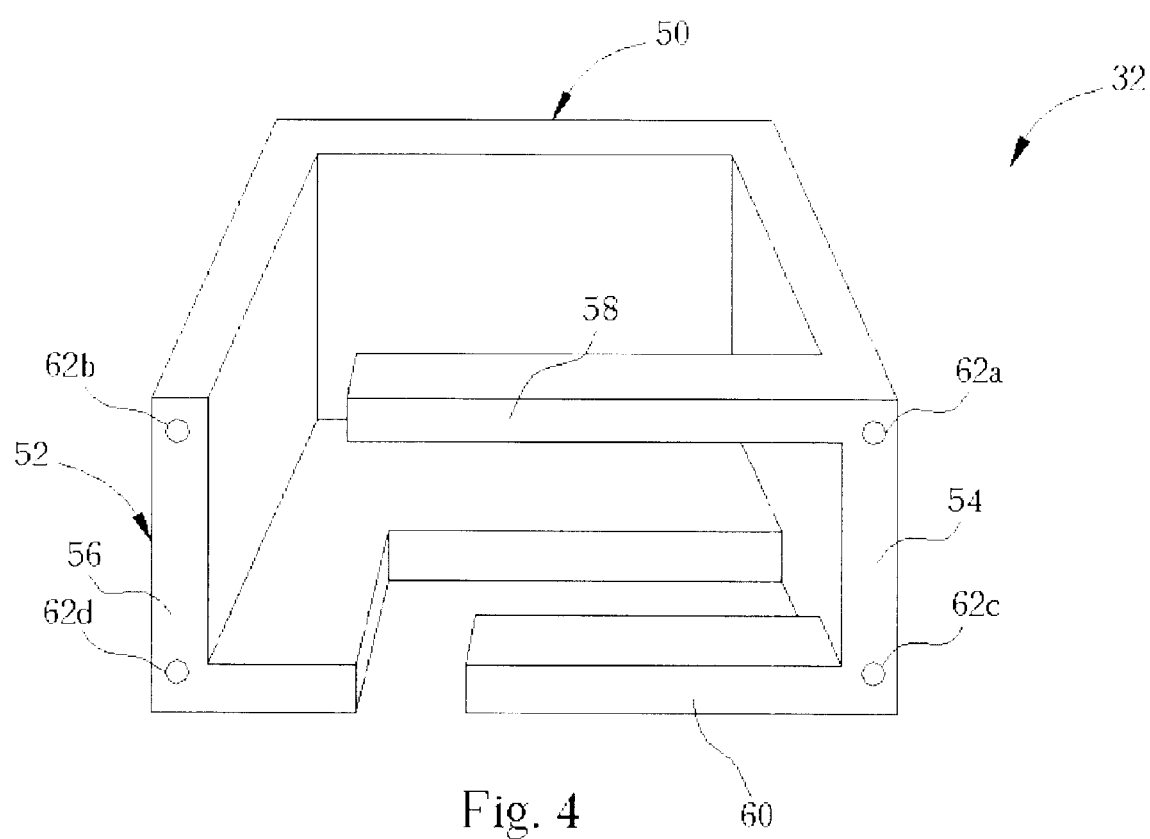
FIG. 4 is a perspective view of the supporting frame according to the present invention.
Figure 5:
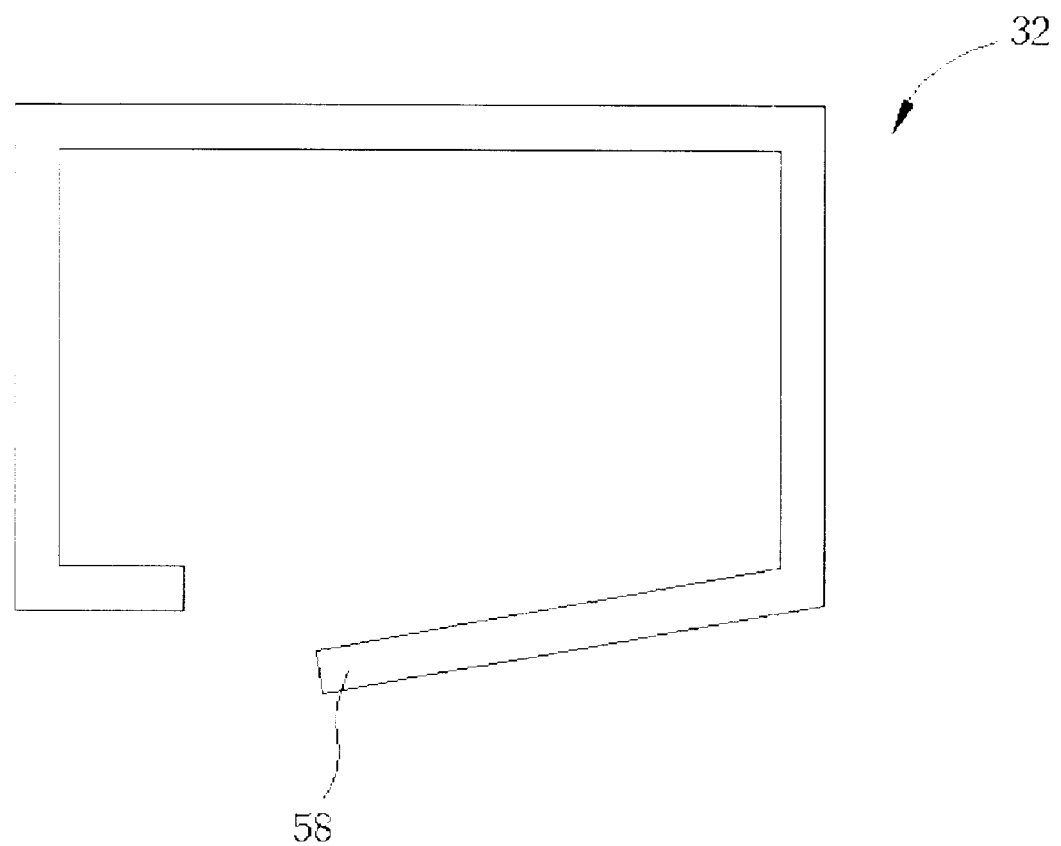
FIG. 5 is a top view of the supporting frame according to the present invention.

Please refer to FIG. 3 to FIG. 5. FIG. 3 is a perspective view of a projector 30 according to the present invention.

FIG. 4 is a perspective view of a supporting frame 32 shown in FIG. 3. FIG. 5 is a top view of the supporting frame 32 of FIG. 3. As shown in FIG. 3, the projector 30 includes the supporting frame 32, a lens 34, a digital micromirror device (DMD) 36, a frame 38, a fixing device 40, and a conductive plastic piece 42. The fixing device 40 is a circuit board electrically connected to the DMD 36 through the conductive plastic piece 42 installed in the frame 38. As shown in FIG. 4, the supporting frame 32 includes a lens holding surface 50 and an object holding surface 52. The lens 34 is installed on the lens holding surface, and the DMD 36 is installed on the object holding surface. A key difference between the prior art and the present invention is that the supporting frame 32 according to the present invention uses flexible and deformable metal materials. The flexible and deformable metal materials can help in adjusting the positions of the DMD 36 and the lens to be parallel.

For easy adjustment, the object holding surface 52 of the supporting frame 32 includes a first fixed side 54, a second fixed side 56, a first elastic protrusion 58, and a second elastic protrusion 60. The first elastic protrusion 58 is between the first fixed side 54 and the second fixed side 56. The first elastic protrusion 58 has one edge connected to the first fixed side 54, and another edge forming a gap with the second fixed side 56. The second elastic protrusion 60 is also between the fist fixed side 54 and the second fixed side 56. The second elastic protrusion 60 has one edge connected to the first fixed side 54, and another edge forming a gap with the second fixed side 56. The two elastic protrusions 58, 60 of the supporting frame 32 each have one edge not connected to the second fixed side to allow the elastic protrusions 58, 60 to deform easily when assembling the protector 30 to adjust the position of the DMD 36. The second elastic protrusion also can also have one edge connected to the second fixed side 56, and another edge forming a gap with the first elastic protrusion 54 3. Various modifications that allow the object holding surface 52 to deform easily are also possible. In addition, the edge not connected to the second fixed side 56 of the first elastic protrusion 58 and the second elastic protrusion 60 are tilted toward the DMD 36, as shown in FIG. 5, so that the elastic protrusions 58, 60 have more elasticity for adjustment.

Figure 6:
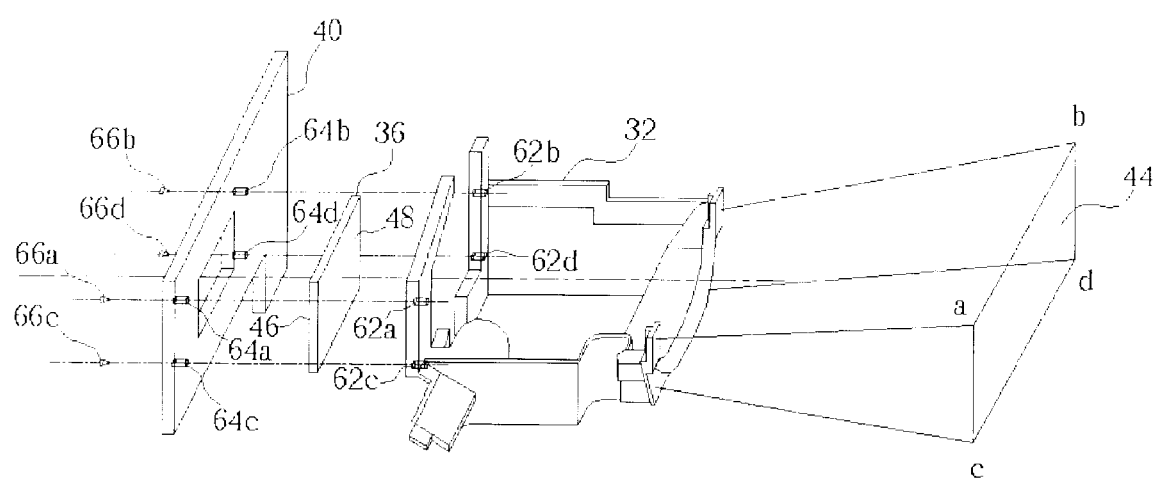
FIG. 6 is a schematic diagram showing a location of the image.

Please refer to FIG. 6. FIG. 6 is a schematic diagram of the location of the image. When installing the leads 34 and the DUD 36 according to the following steps, the placements of the lens 34 and the DMD 36 are optimized with the supporting frame 32. Assume four screw holes 62a, 62b, 62c, and 62d on the object surface 52 of the supporting frame 32 correspond to the four points a, b, c, and d of the screen 44 respectively.

Step 100: Fix the lens 34 on the lens holding surface 52 of the supporting frame 32;

Step 110: Place the frame 38 between the DMD 36 and the fixing device 40, and use four screws 66a, 66b, 66c, and 66d to loosely screw the DMD 36, the frame 38, and the fixing device 40 to the object holding surface 52 of the supporting frame 32 from four holes 64a, 64b, 64c, and 64d on the back of the fixing device 40;

Step 120: Turn on the power of the projector 30, and project the image on the screen 44;

Step 130: Tightly screw the screw 66a into the hole 64a of the fixing device 40, and loosely screw the screws 66b, 66c, and 66d into the holes 64b, 64c, and 64d, so that the first modulator side 46 of the DMD 36 is fixed on the first fixed side 54 of the supporting frame 32, and the second modulator side 48 of the DMD 36 is fixed on the second fixed side 56 of the supporting frame 32;

Step 140: Adjust the focus of the lens 34 to make the image at the point d of the screen 44 clear and in focus;

Step 150: Adjust the screw 66b in the hole 64b to make the image at the point c of the screen 44 dear and focused, and similarly adjust the screws 66c, 66d in the holes 64c, 64d to focus the image at the points b, a of the screen 44;

Step 160: Fix the four screws 66a, 66b, 66c, and 66d in the fixing device with adhesive.

The edges not connected to the second fixed side 56 of the elastic protrusions 58, 60 are tilted toward the DMD 36, and tightly securing the screw 66a tilts the elastic protrusions 58, 60 further. The DMD 36 is far from the less 34 at the location of the loose screw 66b. In the step 150, the screws 66b, 66c, and 66d are adjusted into the holes 64b, 64c, and 64d to deform the elastic protrusions 58, 60 to tilt the lens 34 until the image is clear and in focus on the screen 44.

Figure 7:
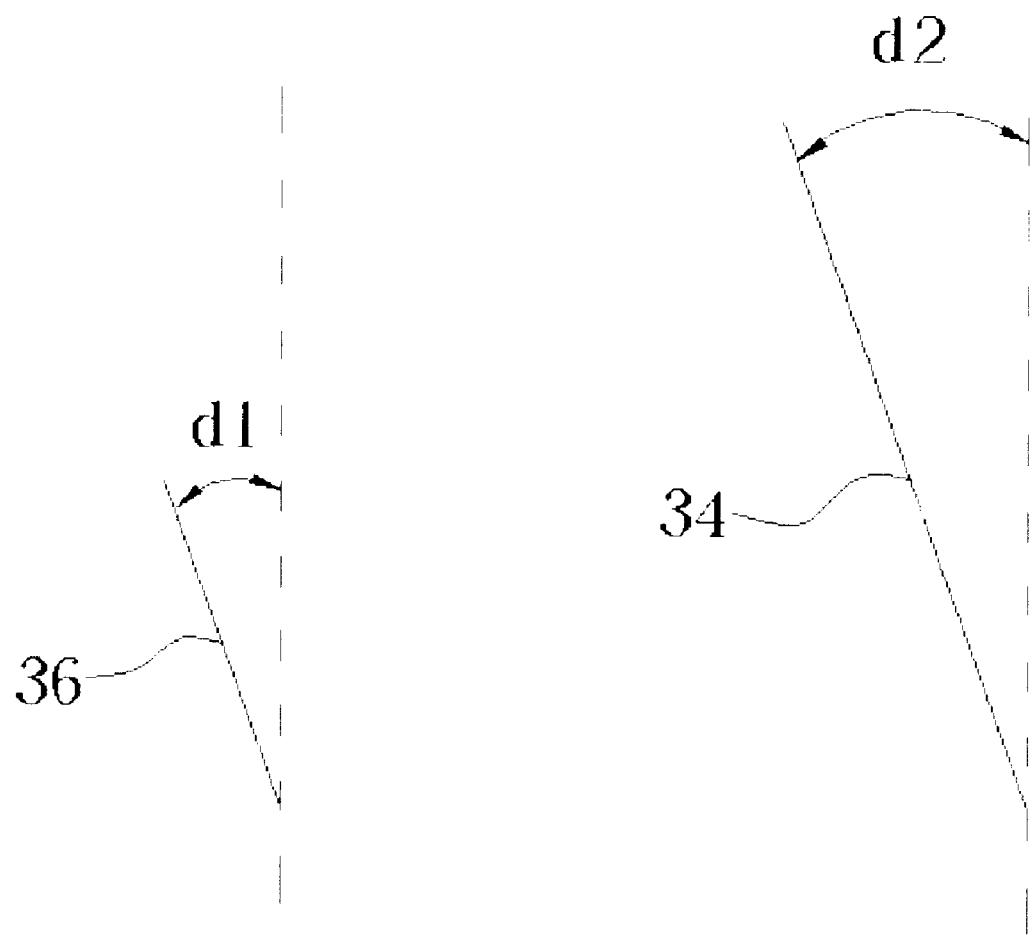
FIG. 7 is a schematic diagram of a correction of adjusting the lens and the image modulator.

Please refer to FIG. 7. FIG. 7 is a schematic of the correction of adjusting the lens and the image modulator. The projector 30 fixes the distance between the DMD 36 and the lens 34, but adjusting the parallel of the DMD 36 and the lens 34 will change this distance and result in the back focus of the lens providing an out of focus image. The supporting frame according to the prior art is made of rigid material, and if the out-of-parallel of the supporting frame is larger than an acceptable value, spacers are installed to adjust the error. On the other hand, the supporting frame 32 according to the present invention has two elastic protrusions 58, 60 for adjusting the position of the DMD 36 to improve the out-of-parallel between the DMD 36 and the lens 34. In general, the size of the lens 34 is at least twice that of the DMD 36. As shown in FIG. 7, the distance d1 changed by adjusting the DMD 36 is smaller than the distance d2 changed by adjusting the lens 34. Therefore, adjusting the DMD 36 improves not only the parallel between the DMD 36 and the lens 34 but also the problem of the back focus of the lens 34.

From the above description, the projector 30 includes the DMD 36, the lens 34, the supporting frame 32, the fixing device 40, the conductive plastic piece 42, and the frame 38. The supporting frame 32 has the lens holding surface 50 and the object holding surface 52. The object holding surface 52 has two fixed sides 54, 56 and two elastic protrusions 58, 60. One edge of each of the two elastic protrusions 56,58 connects to the first fixed side, and another edge of each of the two elastic protrusions 56,58 does not connect to the second fixed side 56. With the flexible material and the elastic protrusions 58, 60 having only one edge connected to the first fixed side 54, the parallel positioning of the DMD 36 and the lens 34 can be adjusted when assembling the projector 30. According to the imaging principle, an image that is close to the lens 34 indicates that the DMD 36 is too far from the lens 34. Therefore, the screws 66a, 66b, 66c, and 66d can be adjusted to deform the elastic protrusions 58, 60 to adjust the distance between the DMD 36 and the lens 34.

In contrast to the prior art, the projector according to the present invention uses flexible and deformable structure and provides elastic protrusions on the object holding surface of the supporting frame. When the lens and DMD are installed on the supporting frame, the elastic protrusions are compressed to adjust the parallel positioning of the DMD and the lens to optimize the focus of the lens. The supporting frame according the prior art uses rigid material that prevents deformation caused by improper force of installing the DMD and the lens. In addition, the parallel positioning of the DMD and the lens of the supporting frame is required to be in an acceptable range because the DMD and the lens have manufacturing tolerance themselves. The present invention provides a projector and the method of assembling a projector to solve the blurred image problem resulting from out-of-parallel dues to imperfect placement of components.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for assembling a projector, the projector comprising:

a lens;

a supporting frame including a first fixed side, a second fixed side, and an elastic protrusion, the first fixed side having a first screw hole, the second fixed side having a second screw hole;

a fixing device having a first through bole and a second through hole respectively located corresponding to the first screw hole and the second screw hole; and an image modulator installed between the supporting frame and the fixing device, the image modulator having a first modulator side and a second modulator side;

the method comprising the following steps:

(a) screwing a first screw into the first screw hole through the first through hole to attach the fixing device onto the supporting frame, the first modulator side of the image modulator fixed neighboring to the first fixed side of the supporting frame;

(b) loosely screwing a second screw into the second screw hole through the second through hole to make the second modulator side of the image modulator press against the elastic protrusion;

(c) projecting an image to a screen, adjusting the lens to make the image projected from the first modulator side of the image modulator focused on the screen; and (d) adjusting the second screw in the second screw hole to position the second modulator side against the elastic protrusion for compressing the elastic protrusion and tilting the image modulator until the image projected from the second modulator side of the image modulator is focused on the screen.

2. The method of claim 1 further comprises fixing all screws with adhesive.

3. The method of claim 1 wherein the image modulator is a digital micromirror device (DMD).

4. The method of claim 1 wherein in the step (d), the supporting frame comprises two elastic protrusions, each elastic protrusion having one end connected to one of the two fixed sides and another end not connected to one of the two fixed sides.

5. A projector comprising:

a lens;

a supporting frame including a first fixed side, a second fixed side, and an elastic protrusion, the first fixed side having a first screw hole, the second fixed side having a second screw hole;

a fixing device having a first through hole and a second through hole respectively located corresponding to the first screw hole and the second screw hole;

an image modulator installed between the supporting frame and the fixing device, the image modulator having a first modulator side corresponding to the first fixed side of the supporting frame, and a second modulator side corresponding to the elastic protrusion;

a first screw received within the first screw hole and the first through hole to attach the fixing device onto the supporting frame, the first modulator side of the image modulator fixed neighboring to the first fixed side of the supporting frame; and a second screw loosely received within the second screw hole and the second through hole to make the second modulator side of the image modulator press against the elastic protrusion for compressing the elastic protrusion and tilting the image modulator;

wherein when rotating the second screw in the second screw hole, the position of the second modulator side of the image modulator is adjusted.

6. The projector of claim 5 wherein the supporting frame comprises two elastic protrusions, each elastic protrusion having one end connected to the first fixed side, and another end forming a gap with the second fixed side.

7. The projector of claim 6 wherein the two elastic protrusions and the first fixed side form a C-shape.

8. The projector of claim 5 wherein the supporting frame comprises two elastic protrusions, one elastic protrusion having one end connected to the first fixed side, and another end forming a gap with the second fixed side, another elastic protrusion having one end connected to the second fixed side, and another end forming a gap with the first fixed side.

9. The projector of claim 8 wherein one elastic protrusion and the first fixed side form an L-shape, and the other elastic protrusion and the second fixed side also form an L-shape.

10. The projector of claim 5 wherein the image modulator is installed in the supporting frame on the elastic protrusion, and the lens is installed on another side of the supporting frame.

11. The projector of claim 10 wherein the elastic protrusion of the supporting frame is tilted toward the image modulator.

12. The projector of claim 5 wherein the image modulator is a digital micromirror device (DMD).

13. The projector of claim 5 further comprising a flexible frame installed between the image modulator and the fixing device for tightly combining the image modulator and the fixing device.

14. The projector of claim 5 further comprising a conductive plastic, wherein the fixing device is a circuit board, the conductive plastic installed between the image modulator and the bog device for electrically connecting the image modulator and the fixing device.

* * * * *